United States Patent
Carder, Sr. et al.

[11] Patent Number: 6,123,123
[45] Date of Patent: Sep. 26, 2000

[54] NON-STRETCH BREAKAWAY HOSE PARTICULARLY FOR FUEL DISPENSER

[75] Inventors: Mervin L. Carder, Sr.; E. Leonard Poli, both of Fenton, Mo.

[73] Assignee: M. Carder Industries, Incorporated, Fenton, Mo.

[21] Appl. No.: 09/365,910

[22] Filed: Aug. 3, 1999

[51] Int. Cl.⁷ ...................................................... B65B 1/04
[52] U.S. Cl. ........................... 141/382; 141/59; 141/389; 137/68.15; 285/2
[58] Field of Search .................... 141/382, 59, 387–389; 137/68.14, 68.15, 614, 614.04; 285/1–4

[56] References Cited

U.S. PATENT DOCUMENTS

| | | | |
|---|---|---|---|
| 3,586,019 | 6/1971 | Thomas et al. | ............................. 137/68 |
| 4,763,683 | 8/1988 | Carmack . | |
| 4,827,960 | 5/1989 | Nitzberg et al. . | |
| 4,886,087 | 12/1989 | Kitchen | ................................... 137/68.1 |
| 5,141,014 | 8/1992 | Poli et al. . | |
| 5,156,191 | 10/1992 | Walker et al. . | |
| 5,209,262 | 5/1993 | Carow et al. . | |
| 5,297,574 | 3/1994 | Healy . | |
| 5,365,973 | 11/1994 | Fink, Jr. et al. . | |
| 5,529,085 | 6/1996 | Richards et al. | ...................... 137/68.15 |
| 5,564,471 | 10/1996 | Wilder et al. . | |
| 5,570,719 | 11/1996 | Richards et al. . | |
| 5,615,706 | 4/1997 | Guertin . | |

FOREIGN PATENT DOCUMENTS

| | | |
|---|---|---|
| 2324130 | 7/1997 | United Kingdom . |
| 9845640 | 10/1998 | WIPO . |

OTHER PUBLICATIONS

DAYCO—"No Lead Hose"—(undated).
Thermoid—"Durability Doesn't Get Any Better Than This"—(undated).
GBG Industries—"Cable assemblies"—(undated).
GBG Industries—Price List TH 1018—Oct. 1, 1998.
Elaflex—"LPG Nozzles, Break–Away Coupling"—pp. 561–562 (1987).

*Primary Examiner*—Steven O. Douglas
*Attorney, Agent, or Firm*—Polster, Lieder, Woodruff & Lucchesi

[57] ABSTRACT

A system for dispensing a fluid from a first tank into a second tank, in which one of the tanks is attached to a vehicle. The system comprises a flexible, stretchable, resilient delivery hose, a first end of the delivery hose being connected to the first tank and a second end of the delivery hose being attached to a nozzle adapted to dispense the fluid into the second tank. A flexible tension element is provided between first and second fittings on the hose, the fittings being separated by at least six feet (two meters), the tension element substantially eliminating stretching of the delivery hose between the fittings. The tension element substantially reduces damage to the hose and to surrounding persons and objects when the hose is pulled and released as in a drive-away from a gasoline dispenser.

31 Claims, 6 Drawing Sheets

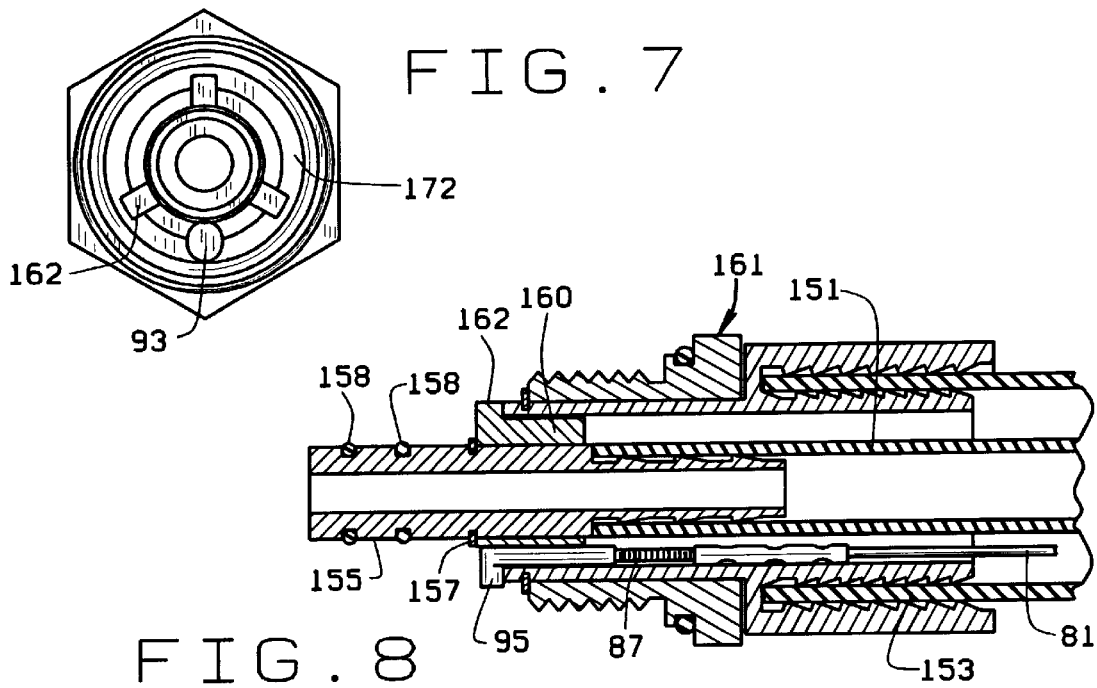
FIG. 7
FIG. 8
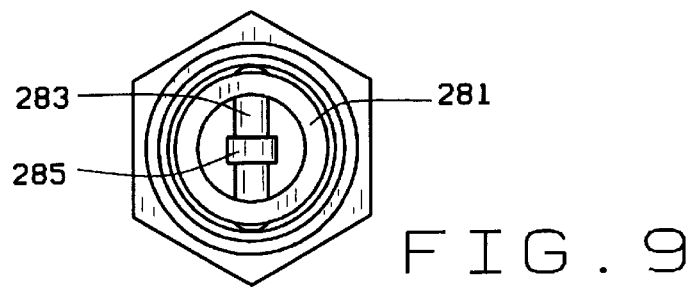
FIG. 9
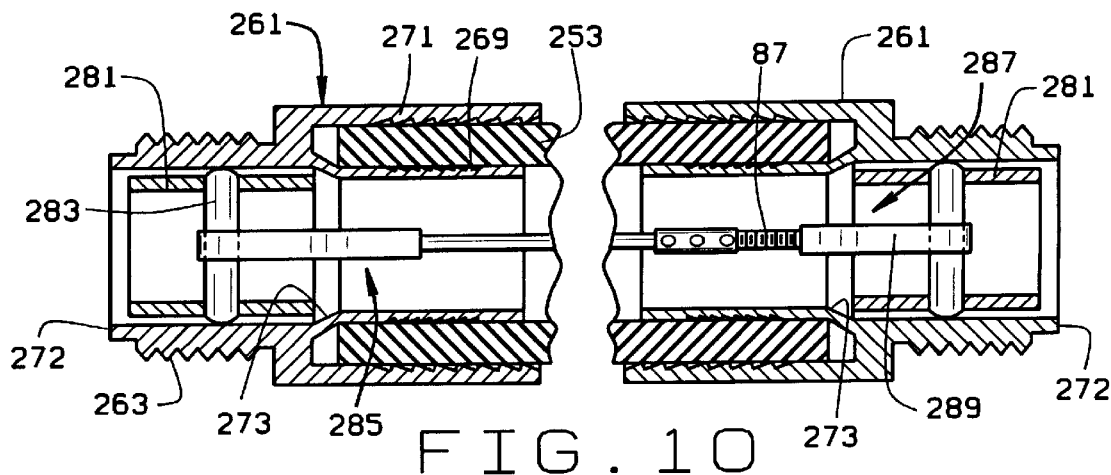
FIG. 10

NON-STRETCH BREAKAWAY HOSE PARTICULARLY FOR FUEL DISPENSER

BACKGROUND OF THE INVENTION

This invention relates to hoses for dispensing fluids from one tank into another, one of the tanks being attached to a vehicle. It has particular application to fuel dispensers of the sort located in automotive service stations. Such dispensers typically include a dispenser body which includes a fluid mass flow meter and a display for showing the volume of fluid dispensed and the price, a manually operable nozzle, and a hose assembly attaching the nozzle to the dispenser. The hose assembly includes a flexible hose having fittings at each end, for connecting the hose to the dispenser and to the nozzle. In a traditional dispenser, a single hose assembly is connected to the side of the body of the dispenser. In a more modern multi-product dispenser, several hose assemblies are attached to an overhead canopy on the dispenser body.

In nearly all service stations in the United States and many in other countries, a breakaway coupling is installed in the dispenser's hose assembly to avoid damage to the pump or dispenser in the event of a drive-away. The breakaway coupling is typically installed in one of two positions in the hose assembly: at the dispenser in multi-product overhead dispensers and at the nozzle for traditional dispensers.

In the multi-product dispensers, the breakaway coupling is typically attached to a short connector hose (known as a "spacer hose" or "whip hose") which is in turn attached to an overhead arm on the dispenser. A "curb" hose is then connected between the breakaway coupling and a manually operated dispensing nozzle. The curb hose is generally over six feet long, typically eight to twelve feet long. This arrangement is shown for example FIG. 1 of Wilder et al., U.S. Pat. No. 5,564,471.

In a traditional dispenser, one end of the curb pump hose is attached to a side or lower portion of the dispenser body, and the other end is attached to the breakaway coupling. The breakaway coupling is attached to the nozzle by a short spacer hose (whip hose). The length of the curb pump hose is similar to that in the multi-product dispenser. Examples of this arrangement are shown in Fink et al., U.S. Pat. No. 5,365,973, and Nitzberg et al., U.S. Pat. No. 4,827,960.

Breakaway couplings are manufactured by many companies and have various constructions. All include two pieces which are intended to uncouple when a vehicle drives away from the dispenser without removing the nozzle from the fuel tank filler pipe. The breakaway coupling is designed to close both the long curb pump hose and the short hose, so as to prevent spillage of fuel in the hoses. By Underwriters Laboratory standards, the breakaway coupling must uncouple under an axial load of no more than three hundred fifty pounds. In practice, breakaway couplings have typically been found to uncouple at loads of from about two hundred fifty pounds to about four hundred pounds. Larger equipment may be provided with breakaway couplings having higher rated breaking forces. Examples of breakaway couplings are found in our U.S. Pat. No. 5,141,014 and the foregoing patent to Wilder et al.

Breakaway couplings are supplied not only on standard fuel dispensers but also on vapor recovery dispensers of both the balance type and the vacuum assist type. In both types of vapor recovery dispensers, coaxial hoses are provided. In the balance type, fuel flows through the central hose and vapor returns through the outer hose. In the vacuum assist type, the fuel flows through the outer hose. A typical vapor recovery hose is shown in Walker et al., U.S. Pat. No. 5,156,191. The cast spider shown in this patent in a balance-type vapor recovery hose is typically used in a vacuum-assist hose, and a simple bent strip spider is typically used in the balance type.

The breakaway couplings for vapor recovery hoses typically close only the fuel-carrying hose when they uncouple, although some close both hoses. Examples of such breakaway couplings are found in the foregoing patents to Fink et al. and Nitzberg et al., as well as in Carmack, U.S. Pat. No. 4,763,683, Carow et al., U.S. Pat. No. 5,209,262, Healy, U.S. Pat. No. 5,297,574, Guertin, U.S. Pat. No. 5,615,706, and Richards et al., U.S. Pat. No. 5,570,719.

With either type of dispenser and any commercially available breakaway coupling, when a drive-away occurs, the hose assembly will straighten out as the vehicle moves away. The spacer hose will bend to allow the breakaway coupling to be aligned with the curb hose for a straight pull on the breakaway coupling.

We have observed that under tension, fuel delivery hoses stretch far more than has heretofore been recognized. As the vehicle continues to move, the hose stretches by ten to twenty percent or more of its length, storing a large amount of energy in the hose. A ten-foot non-vapor recovery gasoline hose may stretch as much as three feet or more before the breakaway coupling separates. A heavier vacuum-assist or diesel fuel type may stretch less but store as much energy. A balance-type vapor recovery hose may stretch much more.

When the breakaway coupling separates, the stretched hose will sling, fling, and whip the hose in all directions with considerable force, with one section of the breakaway coupling at the free end of the long curb pump hose. If the breakaway coupling separates by the dispenser, the force will carry the free end in an erratic path toward the vehicle and can damage the vehicle, injure its occupants, and endanger anyone standing in the area. If the breakaway coupling separates by the vehicle, the curb pump hose will move erratically toward the dispenser and can damage the dispenser and injure anyone standing in the area of the dispenser.

It may be noted that gasoline-dispensing nozzles are generally provided with spouts which are also designed to break off in the event of a drive-away. The break-off load is designed to be about one hundred fifty pounds when the spout is at a right angle to the direction of force. Although a drive-away does not generally result in the spout's being subjected to a sufficient force at this angle to cause the spout to break off, when it does the nozzle is flung back toward the dispenser. Because the nozzle weighs much more than the breakaway (two to three pounds rather than a few ounces), the danger posed by the nozzle when its spout breaks is even greater than that posed by the breakaway when it uncouples.

After a drive-away occurs, the hose has been internally damaged, and the breakaway coupling is frequently damaged. Proper practice is to replace the hose following a drive-away. Failing to replace the hose may result in leakage through the fabric reinforcement of the hose and failure of the hose. The breakaway coupling can be reassembled if it is not damaged. Failing to replace a damaged breakaway coupling, however, may result in leakage around the breakaway coupling or improper operation of the breakaway coupling. The nozzle and its spout must also be inspected for possible damage.

SUMMARY OF THE INVENTION

One of the objects of this invention is to provide an improved hose assembly which is less likely to be damaged or to cause damage when subjected to excessive tension.

Another object is to provide an improved fluid dispensing hose assembly of the type having a breakaway coupling mounted in it.

Another object is to provide such a hose assembly which is less likely to cause damage to property or persons in case of a drive-away.

Another object is to provide such a hose which is less likely to cause damage to the hose or the breakaway coupling in case of a drive-away.

Other objects will become apparent to those skilled in the art in light of the following disclosure and accompanying drawings.

In accordance with one aspect of the invention, generally stated, an improved system is provided for dispensing a fluid from a first tank into a second tank, one of the tanks being attached to a vehicle, the system comprising a flexible, stretchable, resilient delivery hose, a first end of the delivery hose being connected to the first tank and a second end of the delivery hose being attached to a nozzle adapted to dispense the fluid into the second tank. The system includes first and second fittings in the hose, the fittings being separated by at least six feet, and a flexible tension element between the fittings, the tension element substantially eliminating stretching of the delivery hose between the fittings.

In accordance with another aspect of the invention, generally stated, a method is provided for preventing damage to and by a flexible, stretchable, resilient liquid delivery hose used for dispensing a fluid from a first tank into a second tank, one of the tanks being attached to a vehicle, the delivery hose including first and second fittings in the hose, the fittings being separated by at least six feet, the method comprising attaching a flexible tension element between the fittings, the tension element substantially eliminating stretching of the delivery hose between the fittings.

The improved hose itself forms yet another aspect of the invention.

The incorporation of a tension element in accordance with the present invention results in a quicker and more positive uncoupling of the breakaway coupling or breakage of the nozzle spout. This provides several advantages. Because the hose separates before it stretches, the amount of energy stored in the hose is greatly reduced, thereby reducing the damage caused by the hose, the breakaway, and the nozzle. The hose drops to the ground near the pump rather than whipping in the air at a distance from the pump. Furthermore, the vehicle has less time to increase its speed before the separation occurs and the hose pulls free. The presence of the tension element also eliminates the damage which would have been done to the hose had it been stretched and reduces damage to the breakaway and the nozzle.

Preferably, the fittings are separated by about six to eighteen feet, most preferably about eight to eleven feet when the system is a standard gasoline or diesel fuel dispensing system. The tension element preferably is located inside the delivery hose. When the hose comprises inner and outer hose parts, as in a vapor recovery hose, the tension element may extend through the inner hose part or between the hose parts.

Preferably, the hose comprises a breakaway coupling having two detachable parts, each of which comprises a fitting mounting the coupling part to the hose. Preferably, the first fitting mates with one of the fittings of the breakaway coupling and the second fitting is at an end of the hose assembly farthest from the breakaway coupling.

When the breakaway coupling connects a relatively long curb hose to a relatively short spacer hose, it is desirable to include a second tension element in the spacer hose. It has been found that a standard nine-inch spacer hose will stretch about three inches before a typical breakaway coupling uncouples. Including the second tension element will eliminate virtually all the danger and internal damage caused by stretching the spacer hose. If the tension elements are made of metal, like stainless steel, they also provide an additional and positive ground for the nozzle and prevent the buildup of static electricity.

The flexible tension element is chosen to be substantially non-stretchable, stretching less than ten percent as much as the hose under expected maximum load conditions. The preferred tension element has virtually no stretch at two-hundred-fifty pounds tension. When a breakaway coupling is included in the hose, the maximum load will be the force required to uncouple it. A tension element capable of withstanding a tensile force at least twenty percent greater than the rated force needed for separating the breakaway coupling is highly desirable. A tension element capable of withstanding a tensile force of from twenty to seventy-five percent greater than the rating of the breakaway coupling is considered adequate, in view of the desirability of reducing the weight and expense of the tension element. For a gasoline or diesel fuel dispenser, the tension element preferably has a tensile strength of from about three hundred to about twelve hundred pounds, most preferably around five hundred pounds. If the tension element is slightly longer than the straight hose, the hose will stretch a little (perhaps a few inches), but the amount of stretch (hence energy stored in the hose) during a drive-away is still far less than would occur without the tension element.

The flexible tension element is preferably a metal mechanical cable (wire rope), but it may also be a filament, wire, chain, strap or other flexible element which resists stretching. When the tension element is carried inside the hose, as is preferred, the tension element must resist attack by the fluid carried in the hose. Stainless steel is preferred for most purposes. A 1×19 type 302 or 304 stainless steel cable having a diameter of $\frac{1}{16}$" to $\frac{3}{32}$", weighing about eight to twenty pounds per thousand foot length (1.3 to 3.2 oz. per ten foot length), and having a breaking strength of from 500 to 1200 pounds is preferred for gasoline dispenser use. For all purposes, a linear tension element having a cross-sectional area (width times height) of less than 0.1 square inch is preferred, and a linear tension element having a weight of less than about two ounces per linear foot is also preferred. A military specification cable having a nominal zero percent elongation is preferred.

Particularly when the tension element is an after-market item, inserted into an existing hose, it is desirable to include a threaded fitting at one or both ends of the cable assembly to permit adjustment of the length of the cable. Such fittings are well known in the art and are provided with a wide variety of internally threaded connectors, including balls, eyes, hooks, nuts and the like. The tension element may also include a length adjustment or tensioner such as a turnbuckle connecting two pieces of the tension element.

When the first and second hose fittings have unobstructed circular walls at their free ends, as in a non-vapor-recovery fuel dispensing hose, the tension element is preferably mounted to an adapter consisting of a transverse rod carried between diametrically opposed openings in an internal collar. The collar is preferably sized to be force-fit into a hose fitting at the end of the hose assembly, the collar seating on an internal shoulder in the hose fitting to prevent its being pulled through the hose. The tension element includes an externally threaded stud or fitting on which an eye is threaded. The threaded stud permits adjustment of the cable length to correspond to the extended, unstressed, length of the hose between the first and second hose fittings. Threaded studs are well known and widely commercially available. They typically include a threaded section and a tubular section which may be welded, crimped, or swaged onto the end of a cable. An internally threaded collar on the eye permits changing the effective length of the cable. When the tension element is installed at the time the fittings are applied to the hose, the length of the tension element will be more precisely predetermined, and a simpler termination of the tension element, without requiring a threaded fitting may be used. The transverse rod is inserted through the eyelet and the openings in the collar before the collar is inserted into the hose fitting.

When one or both fittings include a spider, as in a typical vapor recovery hose, the tension element may be mounted directly to the spider or may be trapped between the outer hose and the inner hose supported by the spider. A preferred mounting includes a threaded stud on which an adapter is threaded, the adapter including a small flange or lip, sized to be trapped by the spider, or by the coaxial hose parts so that the lip engages either the spider or the hose fitting. This arrangement has been found to provide a universal attachment to either a commercially available balance type or vacuum assist type of vapor recovery hose.

When the tension element is mounted to the outside of an existing hose, it will require special fittings to attach it, and separate fittings (or adhesives) must be applied to the outside of the hose at close enough intervals to prevent the element from draping or otherwise interfering with the use of the hose. When the tension element is installed as the hose assembly is manufactured, however, the tension element may be attached to the inside of the hose, to its outside, or embedded in it. Although not preferred, it may also be formed as a flexible, non-resilient covering, such as a flexible woven metal tube. In any of these cases, the hose fitting preferably clamps the tension element so that it forms a substantially non-stretchable connection between the hose fittings.

Other aspects of the invention will become apparent in light of the following description and drawings.

BRIEF DESCRIPTION OF THE DRAWINGS

FIG. 7 is an end view of the hose and fitting of FIG. 4;

FIG. 8 is a sectional view of the mounting of FIG. 4;

FIG. 9 is an end view of a standard (non-vapor-recovery) hose having a tension element mounted in it by a fitting, in accordance with another embodiment of the present invention, an identical fitting being provided at the other end of the hose;

FIG. 10 is a partially broken sectional view of the hose of FIG. 9, showing the tension element extending through the hose and fittings for mounting the tension element to hose fittings at both ends of the hose;

DESCRIPTION OF THE PREFERRED EMBODIMENTS

Figure 1:
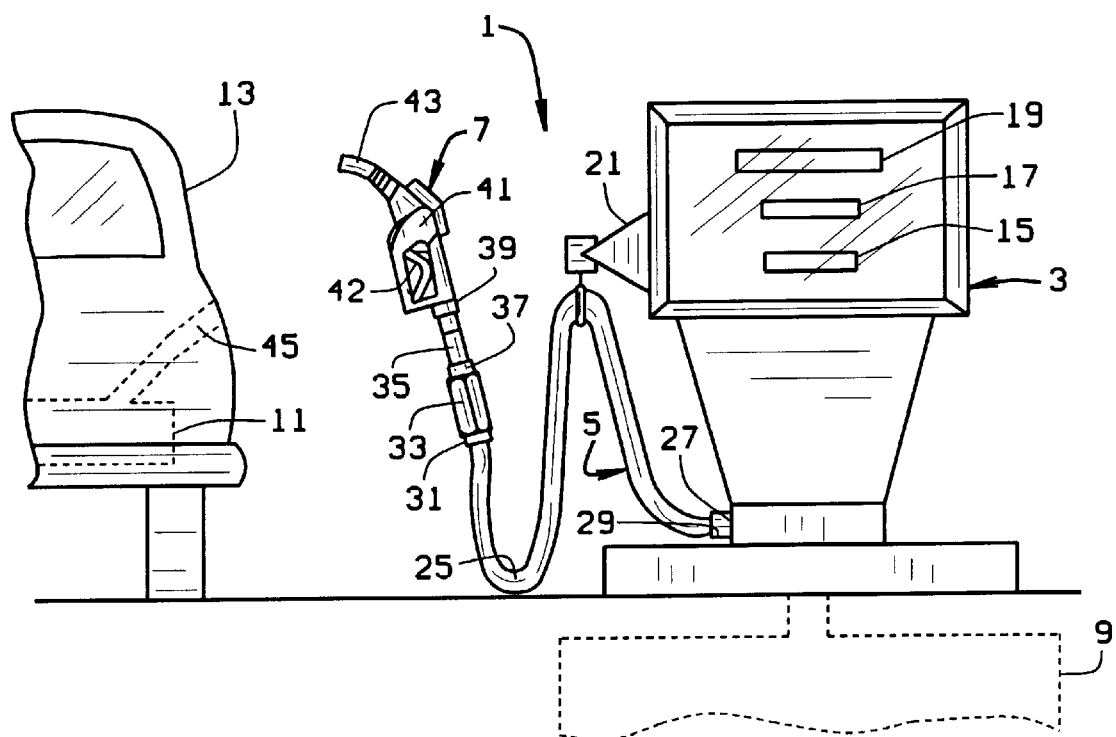
FIG. 1 is a somewhat diagrammatic view in front elevation of a traditional fuel dispenser incorporating the improved hose of the present invention.

Referring now to the drawings, FIG. 1 shows a standard fuel dispenser 1 of a type for which the present invention is advantageous. The fuel dispenser 1 has a dispenser body 3, a delivery hose assembly 5, and a manually operable nozzle 7 for delivering fuel from a tank 9 below the dispenser body 3 to a tank 11 of a vehicle 13.

As shown in FIG. 1, the dispenser body 1 typically includes displays 15, 17, and 19 for displaying a price per gallon, the number of gallons delivered, and the price for the fuel delivered, respectively. It also includes a cradle 21 for holding the nozzle 7. The cradle 21 typically includes a manual lever for turning on a pump to pump fuel from the tank 9 to the nozzle 7.

The delivery hose assembly 5 includes a curb hose 25 attached to a standard fitting 27 at a lower part of the dispenser body 1. The curb hose 25 includes a standard fitting 29 at its proximal end, screwed into the fitting 27 of the dispenser body 1, and an identical fitting 31 at its distal end, screwed into a standard breakaway coupling 33. A short whip hose 35 is connected between the breakaway coupling 33 and the nozzle 7. The whip hose 35 is provided with standard fittings 37 and 39 identical with the fittings 29 and 31. The fittings 37 and 39 are screwed into corresponding fittings in the breakaway coupling 33 and the nozzle 7. Illustratively, the curb hose 25 is ten feet long, the whip hose 35 is nine inches long, and the breakaway coupling 33 is designed to pull apart under an axial load of no more than three hundred fifty pounds, illustratively three hundred pounds, blocking both the curb hose 25 and the whip hose 35 when it uncouples. The curb hose 25 and the whip hose 35 are typically made of a rubber which is impervious to the effects of gasoline. The structure of the hoses will be described in more detail hereinafter, but they are preferably standard, commercially available hoses.

The nozzle 7 includes a body 41 containing a shut-off valve operated by a manually operated lever 42. A nozzle spout 43, proportioned to fit into the fill tube 45 of the vehicle tank 11, includes a scored break-off designed to break at a force of about onehundred-fifty pounds applied normal to the axis of the spout.

Figure 2:
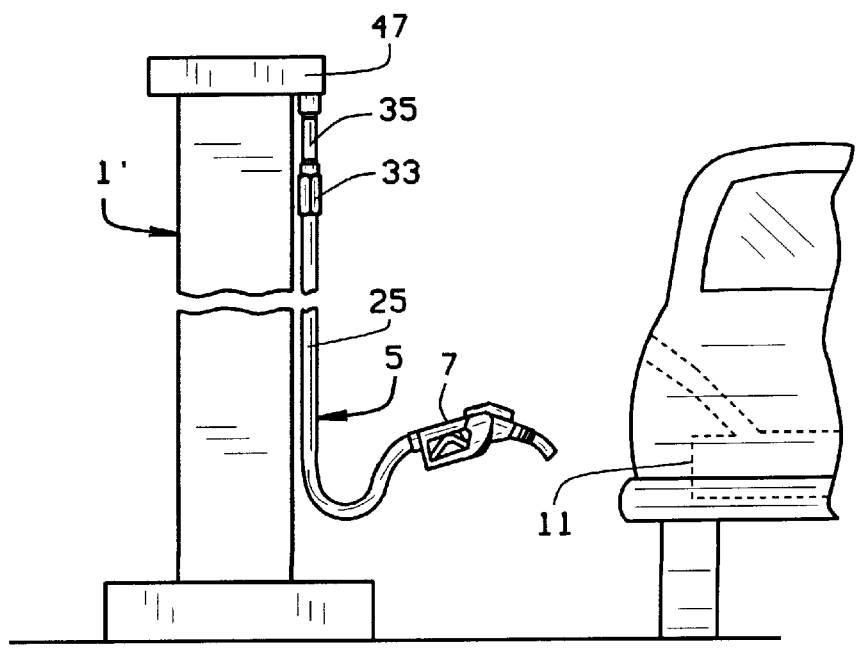
FIG. 2 is a somewhat diagrammatic view in side elevation of a multi-product fuel dispenser incorporating the improved hose of the present invention.

As shown in FIG. 2, another illustrative standard fuel dispenser is a multi-product dispenser having several hose assemblies 5 attached to an overhead canopy 47 on the dispenser body 1'. Each hose assembly 5 may be identical with the hose assembly 5 of the standard dispenser of FIG. 1, but with the whip hose 35 attached to a canopy 47 of the dispenser body rather than to the nozzle 7, and the curb hose 25 attached to the nozzle 7 rather than to the dispenser body.

The hose assembly 5 in present use is one of three standard fuel dispensing designs: a balance type vapor-recovery hose, a vacuum assist type vapor-recovery hose, or a standard (non-vapor-recovery) hose. The following examples illustrate ways of carrying out the present invention with each of these types, and then illustrate ways of modifying the hose assemblies themselves in accordance with the present invention.

Figure 3:
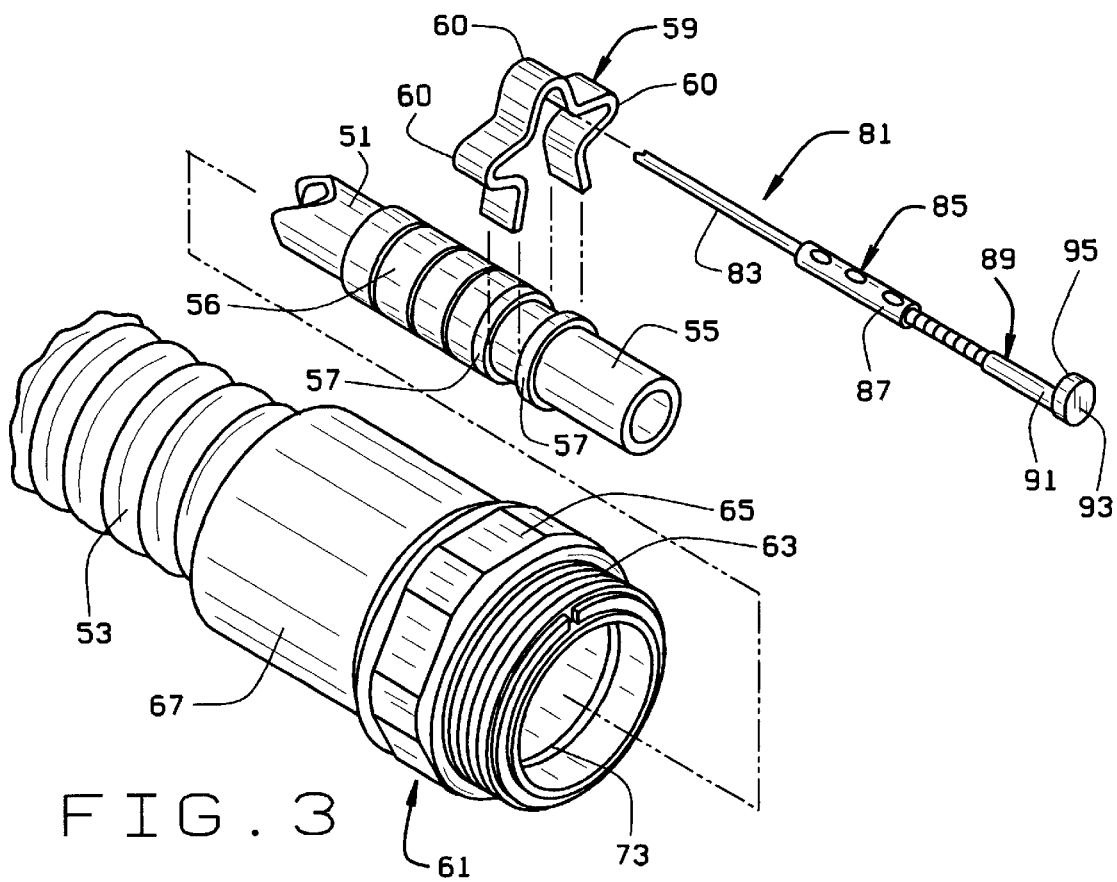
FIG. 3 is a fragmentary exploded view in perspective of a balance-type vapor-recovery hose for use in the fuel dispenser of FIG. 1 or FIG. 2, the hose having a tension element mounted in it by a fitting, in accordance with one embodiment of the present invention, indentical fitting being provided at the other end of the hose.
Figure 4:
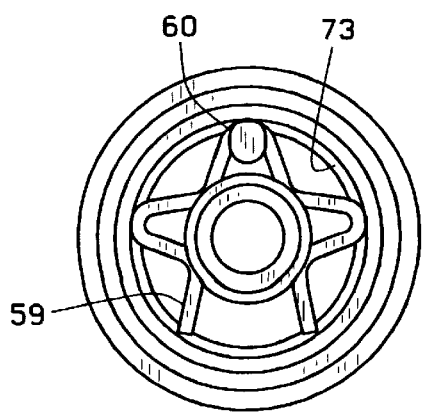
FIG. 4 is an end view of the hose and fitting of FIG. 3.
Figure 5:
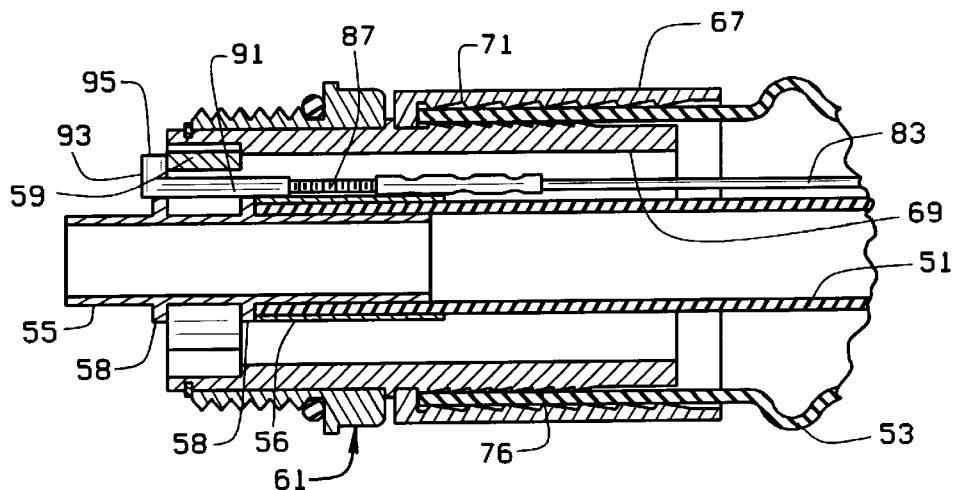
FIG. 5 is a sectional view of the mounting of FIG. 3.

FIGS. 3–5 illustrate a simple modification of a balance type vapor-recovery hose in accordance with the present invention. As shown in FIGS. 3–5, a typical balance type hose includes a flexible, stretchable, resilient, rubber fuel-carrying inner hose 51, and a plastic, helical-wire-reinforced, vapor-carrying outer hose 53. The outer hose 53, like a vacuum cleaner hose, is easily extended and compressed. The end of the inner hose 51 is capped by a metal fitting 55 having two spaced-apart circumferential protrusions 57. A star-shaped metal stamping 59 forms a clip or spider for mounting the inner hose in the outer hose. The clip 59 is formed with three lobes 60. The clip 59 snaps onto the fitting 55 between the protrusions 57. The outer hose 53 is capped by a fitting 61. The fitting 61 includes a threaded end part 63, flats 65, an outer sleeve part 67 and an inner sleeve part 69. The annular space between the sleeves 67 and 69 receives the outer hose 53. Teeth 71 on the sleeves 67 and 69 tightly engage the outer hose 53, forming a gas-tight fit with it. The fitting 61 includes an internal shoulder 73. When the inner hose 51 is slid into the outer hose 53, the clip 59 seats on the shoulder 73 and positions the inner hose 51 axially and radially in the outer hose 53. It will be seen that the other end of the inner hose 51 may be extended beyond its intended axial position by pulling the inner hose 51, compressing the outer hose 52, or coiling the hose assembly, thereby allowing the clip 59 to be installed on the inner hose after it has been assembled into the outer hose. It will be seen that when the fuel dispenser of FIG. 1 is a balance type vapor-recovery system, the fittings 29, 31, 37, and 39 of FIG. 1 are each constituted of the inner fitting 55 and ourher fitting 61.

Both the curb hose 25 and the whip 35 hose are formed in exactly the same way.

As thus far described, the dispenser and hose are entirely conventional and are well known in the art.

In accordance with the present invention, a tension element 81 is installed between hose fittings at opposite ends of at least the curb hose 25. The tension element greatly reduces or eliminates stretching of the curb hose 25 in the event of a drive-away.

As shown in FIGS. 3–5, the preferred tension element 81 is a stainless steel mechanical cable assembly. A military specification 1×19 type 302 or 304 stainless steel cable 83 having a diameter of $\frac{1}{16}$", weighing about 8.5 pounds per thousand foot length, having a breaking strength of 500 pounds, and having a nominal zero percent elongation is preferred. Such a cable is available from GBG Industries of Hinsdale, N.H. Cable fittings 85 at the ends of the cable 83 are provided in the form of threaded studs 87 to which are threaded adapters 89. The threaded stud 87 is available from the same source, as its MS 2159 stainless threaded stud. The adapter 89 includes an internally threaded tubular body 91 and an asymmetric head 93 having a lip 95. The head 93 of each adapter 89 is inserted into the central lobe 60 of a clip 59, with the lip 95 engaging the lobe 60, as shown in FIGS. 4 and 5, before the clip is pushed onto the inner hose fitting 55. When the clip 59 is snapped onto the fitting 55, the adapter's tubular body 91 is held frictionally between the fitting and the clip. Before the second adapter 89 is placed into its clip, the length of the adapter is appropriately adjusted by screwing the adapter in or out on its stud 87.

Preferably, an identical tension element of appropriate length is installed in the whip hose 35 in the same manner.

When the tension element 81 is installed in the curb hose assembly 25, the curb hose is prevented from stretching beyond the length of the tension element 81. If a second tension element 81 is installed in the whip hose assembly 35, it performs the same function. Moreover, because the tension element assemblies are made of metal, they form a large, unbreakable, positive grounding wire from one end of the delivery hose to the other. This grounding wire supplements the usual fine grounding wire in the hose. During normal operation of the fuel dispenser system, the tension element 81 has no substantial deleterious effect on delivery of fuel, manipulation of the flexible hose, or operation of the nozzle. If a driver pulls away from the dispenser without removing the nozzle 7 from the vehicle's filler tube, however, the tension element or elements are quickly pulled taut before the hose assembly can be stretched sufficiently to store any great amount of energy. This results in a quicker and more positive uncoupling of the breakaway coupling or breakage of the nozzle spout. It also greatly reduces the damage caused by the hose, the breakaway, and the nozzle. The hose drops to the ground near the pump rather than whipping in the air at a distance from the pump. Furthermore, the vehicle has less time to increase its speed before the separation occurs and the hose pulls free. The presence of the tension element also eliminates the damage which would have been done to the hose had it been stretched and reduces damage to the breakaway and the nozzle. Replacement of the hose is eliminated, and in most cases the breakaway coupling can be reassembled.

Figure 6:
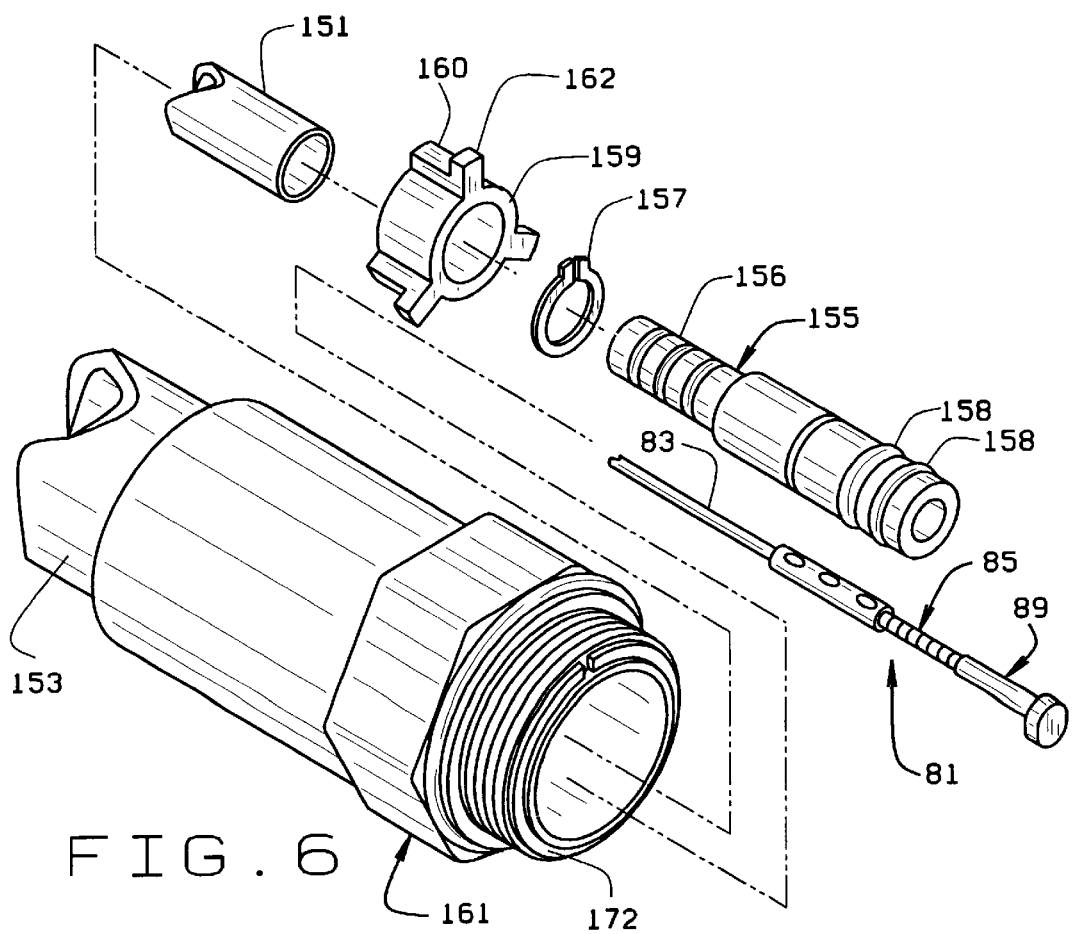
FIG. 6 is a fragmentary exploded view in perspective, corresponding to FIG. 3, of a vacuum-assist vapor-recovery curb hose having a tension element mounted in it by the fitting of FIG. 3, in accordance with one embodiment of the present invention, an identical fitting being provided at the other end of the curb hose.

FIGS. 6–8 illustrate the use of the tension element 81 in a vacuum-assist fuel delivery hose assembly in which vapor is returned through a central hose 151 and fuel flows between an outer hose 153 and the inner hose 151. The inner hose 151 of this type of hose is typically made of a flexible, gasoline-resistant plastic and is thinner than the inner hose 51 of the balance type hose assembly. A metal fitting 155 is provided on the ends of the inner hose 151. The metal fitting 155 is provided with a barbed neck 156 which is inserted and held in the inner hose 151, with a snap ring 157 taking the place of circumferential flanges 57 and a pair of spaced-apart o-rings 158 for sealing the inner hose to a female fitting in the mating hose fitting. The outer hose 153 in this type of hose is made of rubber and is considerably thicker than the outer hose 53 of the balance-type vapor recovery hose assembly. Its fitting 161, like the fitting 61, is formed in two coaxial telescoped pieces held together by a snap ring, as is common in the marketplace. Like the fitting 61 of the balance type hose assembly, the outer piece of the fitting 161 includes a threaded part 163 and flats 165. A common expedient for positioning the inner hose 151 in the outer hose 153 is a cast metal spider 159 having stepped arms 160. At one end of the hose 151, the spider 159 is cast integral with the fitting 155. At the other end, the spider is slipped over the inner hose fitting 155 before the o-rings 158 are slipped on. The stepped ends 162 of the stepped arms 160 rest on the open axial end 172 of the threaded part 165 and the remaining portions of the arms 160 position the spider 159, hence the inner hose 151 radially in the outer hose 153. This construction is well known in the art.

The tension element 81 of the previous embodiment may also be used with the vacuum assist hose of FIGS. 6–8 by positioning it between the legs 160 of the spider 159, so that the adapter is trapped between the spider 159 and the inside of the fitting 161, and so that the lip 95 engages the open axial end 172 of the threaded part 165. Because the head 93 of the adapter 89 has an axial height equal to or slightly less than the height of the outer, stepped portions of the legs 160, it does not interfere with mating the fitting 161 to a female fitting, and the head 192 of the adapter 189 is trapped between the fitting 161 and the female fitting, which substantially prevent axial movement of the adapter 89.

In this embodiment, too, a tension element must be provided in the curb hose, and it is preferred that one be provided in the whip hose also.

In operation, the tension element 81 performs the same functions in this embodiment as in the previous embodiment. Although the heavier vacuum assist hose assembly does not stretch as far as the balance type hose assembly in the absence of the tension element 81, it stores a great deal of energy as it is stretched, and snaps back with great vigor when the linkage between vehicle and dispenser breaks. With the tension element 81, the hose assembly stretches only a small fraction of the distance it would stretch without the tension element, if it stretches at all, before the breakaway coupling or nozzle spout separates cleanly and the hose drops harmlessly and unharmed to the ground.

In a standard, non-vapor recovery delivery hose assembly 5, no spider exists to hold a tension element, and a connection between the tension element and the hose fittings must be established. Numerous inserts can be fashioned to perform the function of holding the tension element axially in the fitting. Examples are shown in FIGS. 9–16.

As shown in FIG. 10, in a non-vapor-recovery hose assembly, the hose fittings 261 on the curb hose and whip hose may be substantially similar to the outer hose fitting 61 on the balance type vapor recovery hose assembly of the first example. The fitting 261 includes a threaded part 263 having an axial end surface 272 and an internal shoulder 273. The hose 253 is held between annular jaws 269 and 271.

As shown in FIGS. 9 and 10, a tubular insert 281 is formed having an outer diameter just less than the inner diameter of the fitting 261. Diametrically opposed holes in the insert 281 support a pin 283 having beveled ends and a length just greater than the inner diameter of the fitting 261. The tension element 81, in the form of the mechanical cable 83 of the previous embodiments, is provided with cable fittings 285 and 287 at the respective ends of the cable 83. The cable fitting 285 includes an eyelet 291 swaged onto its end. The eyelet is aligned with the holes in the insert 281, and a pin 283 is passed through the holes and the eyelet to lock the eyelet to an insert 281. The cable fitting 287 includes a threaded stud 87 to which is threaded an eyelet adapter 289.

The cable 83 is attached to the cable fittings 285 and 287 and is inserted through the length of the hose 253. The cable fitting 285 is mounted to the first insert 281 by running a pin 283 through the eyelet 291 and pushing the insert 281 into the hose fitting 261 until it is in abutment with the shoulder 273. The eyelet adapter 289 is turned to match the length of the cable assembly to the length of the hose 253, and the hose 253 is coiled to cause the cable to extend axially beyond the end of the hose. A pin 283 is passed through the holes in a second insert 281 and through the eyelet adapter 289. The insert 281 is then pushed into its hose fitting 261. The pins 283 hold the inserts 281 frictionally in the hose fittings 261.

The tension element performs the same functions, with the same advantages, as the tension elements of the prior embodiments.

Figure 11:
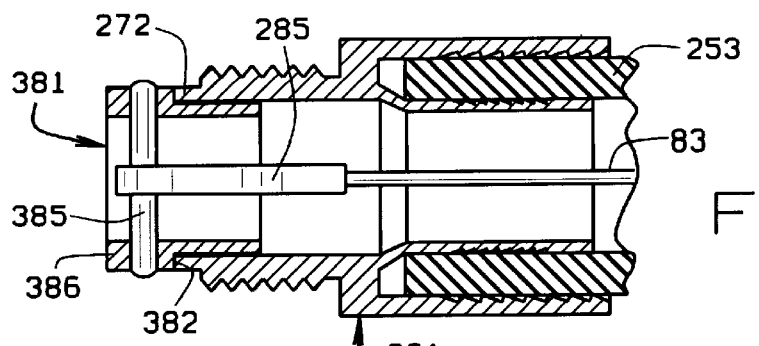
FIG. 11 is a partially broken sectional view, corresponding to one end of the hose of FIG. 10, showing another embodiment of fitting for mounting the tension element to a hose fitting.

In the embodiment shown in FIG. 11, a tubular insert 381, similar to the insert 281 of the previous embodiment, includes a shoulder 382 which rests on the end 272 of the fitting 261. In this embodiment, inserting a pin 385, longer than the pin 285, through a cross-bore in the enlarged end 386 is simplified because the enlarged end 386 extends beyond the end of the hose fitting 261. Adjustment of the length of the tension element is also greatly simplified. This construction requires knowledge, however, that the fitting into which the hose fitting 261 is threaded is deep enough to accommodate the enlarged end 386. It also requires that the pin 385 fit snugly enough in the tubular insert that it will not fall out prior to assembly of the hose fitting into a nozzle 7, a breakaway coupling 33, or a dispenser body fitting 27.

Figure 12:
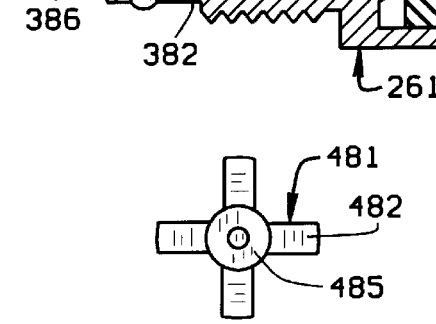
FIG. 12 is an end view of another embodiment of fitting for mounting the tension element to a hose fitting.
Figure 13:
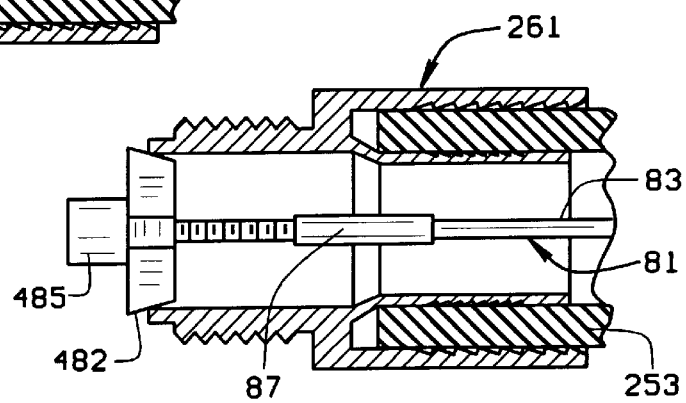
FIG. 13 is a partially broken sectional view, corresponding to FIG. 11, showing the fitting of FIG. 12 mounting the tension element to a hose fitting.

The embodiment shown in FIGS. 12 and 13 utilizes a cast spider 481 having tapered arms 482. The lower ends of the arms fit into the open end of the hose fitting 261, and the upper ends of the arms are larger than the inside diameter of the hose fitting 261 but smaller than the outer diameter. A threaded stud fitting 87 on the cable assembly 81 extends though a central opening in the spider 481. A nut 485 adjusts the length of the tension element 81. The nut 485 is preferably a separate element, but could be molded and threaded integrally with the spider 481.

Figure 14:
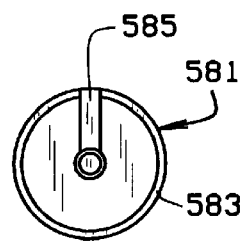
FIG. 14 is an end view of another embodiment of fitting for mounting the tension element to a hose fitting.
Figure 15:
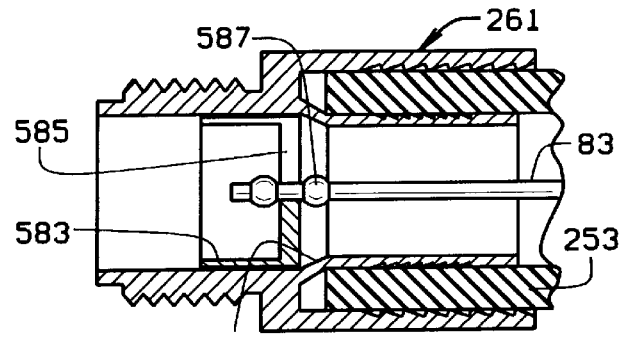
FIG. 15 is a partially broken sectional view, corresponding to FIG. 11, showing the fitting of FIG. 14 mounting the tension element to a hose fitting.

As shown in FIGS. 14 and 15, a simplified mounting 581 may be utilized when the length of the hose 253 is known accurately before the cable assembly is made. The mounting 581 includes a cup 583 with a radial slot 585. The cup 583 has an outer diameter substantially equal to the inner diameter of the hose fitting 261. The cup is restrained frictionally in the hose fitting 261 and is positively axially restrained by the shoulder 273. The cable 83 is provided with a double ball fitting 587 at each end. The double ball fitting 587 is installed in the cup slot 585 before the cup is installed in the hose fitting 261 and restrains the tension element 81 from axial movement when the hose 253 is stretched and also from axial movement out of the hose 253 when the hose 253 is coiled or otherwise unstraightened.

Figure 16:
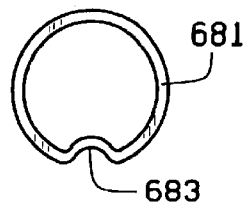
FIG. 16 is an end view of another embodiment of fitting for mounting the tension element to a hose fitting.
Figure 17:
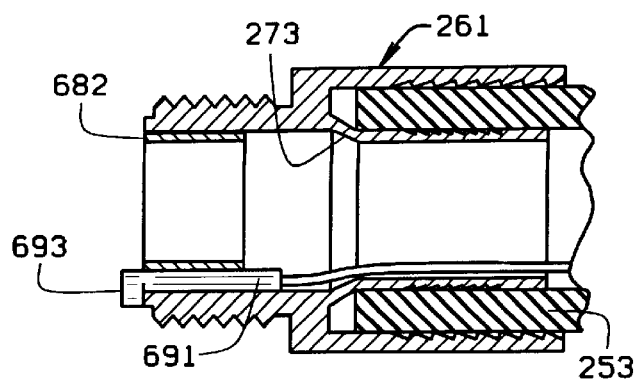
FIG. 17 is a partially broken sectional view, corresponding to FIG. 11, showing the fitting of FIG. 16 mounting the tension element to a hose fitting.

As shown in FIGS. 16 and 17, a simple bent ring 681, having a dimple 683, may be utilized with a tension element having end fittings like the end fittings 85 of the embodiment of FIGS. 3–8. As shown in FIG. 17, a simplified headed fitting 689 may be formed similar to the headed fitting 89, but with a tubular body 691 which is swaged directly onto the cable 83. The tubular body 691 extends between the dimple 683 and the inside of the hose fitting 261. A head 693, corresponding to the head 93, engages the end 272 of the fitting 261.

The foregoing examples are particularly well adapted to carrying out the present invention with a pre-existing hose assembly. It is also possible to incorporate the tension element in the manufacture of the hose assembly. The various spiders and other similar connectors illustrated by the foregoing examples may be made integral with the hose fittings. Other connectors may also be built into the hose fittings and used with other tension elements, as illustrated in FIGS. 18–20.

Figure 18:
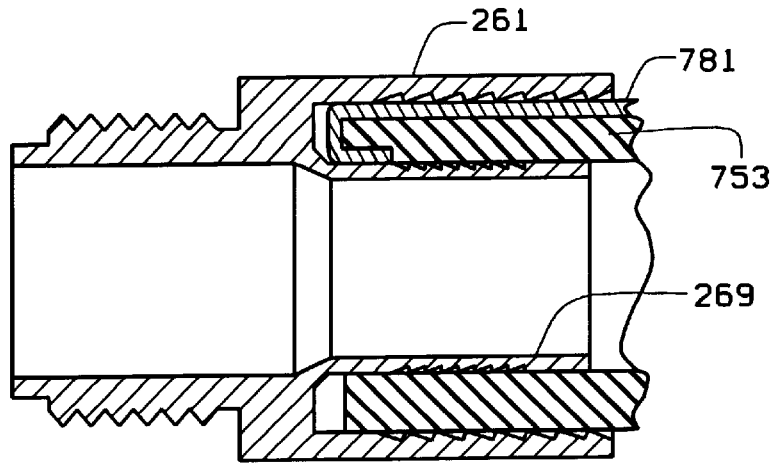
FIG. 18 is a partially broken sectional view, corresponding to FIG. 11, showing a tension element mounted to a hose fitting and extending along the exterior of the hose.

As shown in FIG. 18, a flexible stainless steel cable 781 may be adhered to the outside of a hose 753. The cable 781 functions as an elongate, linear, tension element to prevent the hose 753 from stretching more than ten percent as much as it would stretch without the tension element 781. Preferably, when the hose is cut before its fittings 261 are applied, a small section of the cable 781 is left and is wrapped around the end of the hose 753 before the fitting 261 is applied and the inner annular jaw 269 is expanded to lock and seal the hose fitting 261 on the hose 753. The length of the free end of the cable 781 is kept short enough to allow a sufficient sealing length of the inner annular jaw directly to the inside of the hose 753, thereby ensuring a tight seal between the fitting 261 and the hose 753.

The cable 781 performs the same function as the tension element 81 in the foregoing examples. Because the cable 781 is on the exterior of the hose, rather than its interior, it is important to prevent it from separating too far from the hose 753 when the hose flexes. Rather than adhering the cable 781 with known adhesives, it may alternatively be held at intervals by ties, or, preferably, a thin flexible shrink-wrapped sleeve may be applied over the hose 253 and cable 781 before the fittings 261 are attached to the hose 253.

Figure 19:
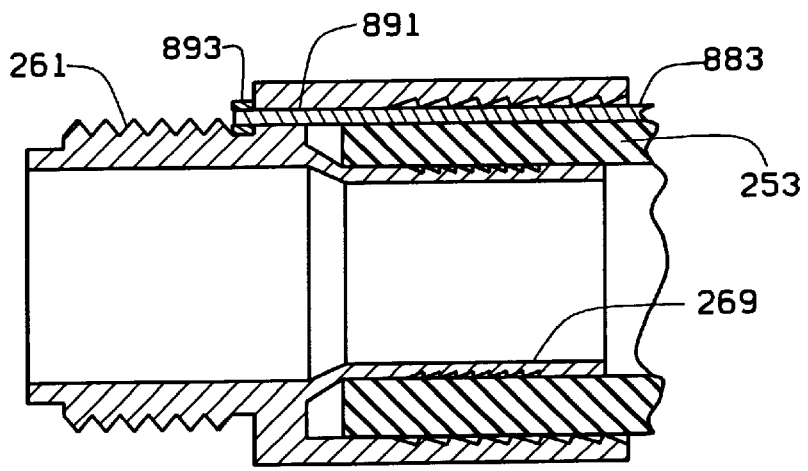
FIG. 19 is a partially broken sectional view, corresponding to FIG. 11, showing another way of mounting a tension element to a hose fitting with the tension element extending along the exterior of the hose.
Figure 20:
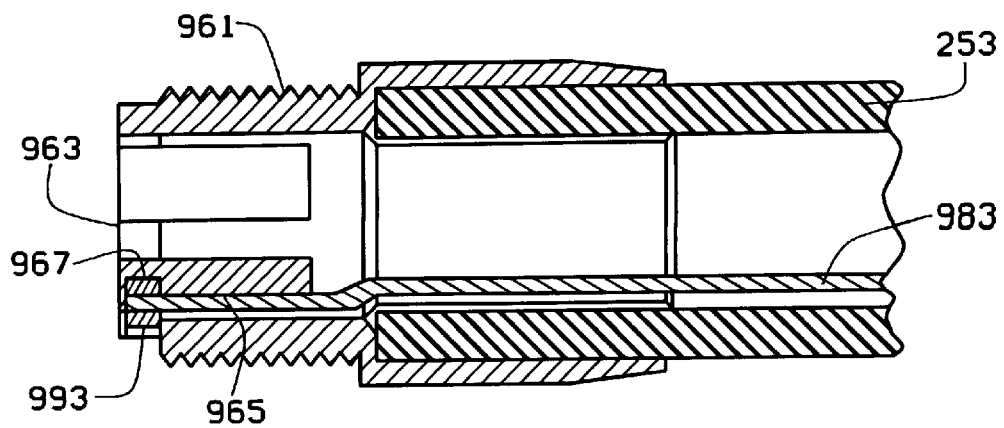
FIG. 20 is a partially broken sectional view, corresponding to FIG. 11, showing a hose fitting modified for mounting the tension element to the hose fitting.

As shown in FIG. 19, a similar construction may utilize a cable 883, like the cable 83 of the first embodiment. The fitting 261 is modified by drilling a hole 891 through which the cable 883 extends. A simple swaged cable fitting 893 holds the cable to the hose fitting 261. The cable is inserted into the fitting 261 with the hose 253 before the inner jaw 269 of the fitting 261 is expanded to seal the fitting to the hose. The cable 883 may be held to the hose 253 in the same ways the strap 781 is held to the hose 753.

As shown in FIG. 20, a tension element in the form of a cable 983 may be run through the interior of a hose 253, either attached to the interior of the hose or loose, and attached to a modified hose fitting 961. The modified hose fitting 961 differs from the hose fitting 261 primarily in that its distal end is modified to include reinforcing ribs 963, in one of which is formed a longitudinal opening 965, with a notch 967 adjacent its end to accommodate a swaged fitting 993 on the end of the cable 983. The cable 983 is thus trapped between hose fittings 961 at the ends of the hose 253. The cable 983 and cable fitting 993 perform the same functions as the cable assembly 81 of the first embodiment. It will be appreciated that the cable fitting 993 could be formed as an integral part of the hose fitting 961, and the cable clamped in it at the same time the hose is clamped in the hose fitting 961.

Numerous variations in the present invention within the scope of the appended claims will be apparent to those skilled in the art in light of the foregoing description.

Merely by way of example, the system may be utilized with larger fuel dispensing systems such as those used for fueling large diesel trucks, in which case longer hoses and larger components will be used.

The first tank may be mounted in a vehicle and the nozzle utilized to fill a stationary tank, as in a fuel oil truck delivering fuel oil. When fuel oil is delivered, the nozzle is frequently pulled by the driver from the truck to the tank. After delivery is complete the nozzle is removed from the tank, then the delivery hose is wound up on the truck, dragging the nozzle back to the truck. Should the nozzle become caught, the inclusion of a tension element in the hose, in accordance with the present invention prevents damage to the hose and also prevents damage to person and property when the nozzle becomes dislodged.

Numerous other elongate, flexible tension elements may be utilized, including, by way of example, straps, such as flat extruded straps, woven metal straps, or twin parallel wires separated by a plastic or woven strap. Straps are particularly desirable if the tension element is secured to the hose by the coaxial jaws of the hose fittings in the manufacture of the hose assembly. The strap could be laminated into the hose. Even in such a construction, it is preferred that the strap or other tension element includes a fitting or other discontinuity at each end, to provide an enlargement or recess at each end for more positive retention in the hose fitting. In a less preferred embodiment, the embedded tension element is simply held at its ends by the force of the jaws of the hose fittings, exerted through the elastomeric hose.

Numerous other cable or strap fittings can be utilized in combination with the hose fittings to secure the tension element assembly to the hose assembly. For many purposes, it is desirable that the fittings restrict movement of the cable out of the hose, to prevent tangling when the hose is coiled, although as shown in some of the foregoing illustrative embodiments it is not always essential.

These variations are merely illustrative.

The patents mentioned herein are hereby incorporated by reference.

We claim:

1. A system for dispensing a fluid from a first tank into a second tank, one of the tanks being attached to a vehicle, the system comprising a flexible, stretchable, resilient delivery hose, a first end of the delivery hose being connected to the first tank and a second end of the delivery hose being attached to a nozzle adapted to dispense the fluid into the second tank; first and second fittings on the hose, the fittings being separated by at least six feet, and a flexible tension element between the fittings, the tension element substantially eliminating stretching of the delivery hose between the fittings.

2. The system of claim 1 wherein the hose comprises a breakaway coupling having two detachable parts, each detachable part comprising a fitting mounting the coupling part to the hose, the first fitting being one of the fittings of the breakaway coupling and the second fitting being at an end of the hose farthest from the breakaway coupling.

3. The system of claim 2 wherein the flexible tension element stretches less than ten percent as much as the hose under expected maximum load conditions.

4. The system of claim 2 wherein the tension element is capable of withstanding a tensile force at least twenty percent greater than the rated force needed for separating the breakaway coupling.

5. The system of claim 2 wherein the first tank is attached to a fuel dispenser body, the tension element having a breaking strength of at least about five hundred pounds.

6. The system of claim 2 wherein the first tank is attached to a fuel dispenser body, the first and second fittings being mounted in a curb hose part of the hose, and wherein the other fitting of the breakaway coupling and a fourth fitting are mounted in a spacer hose part of the hose, the spacer hose being shorter than the curb hose, the system further comprising an electrically conductive flexible element connecting the other fitting of the breakaway coupling and the fourth fitting, the electrically conductive flexible element and the tension element forming an electrical connection between the nozzle and the dispenser body.

7. The system of claim 6 wherein the electrically conductive flexible element stretches less than ten percent as far as the spacer hose would without the flexible element when the spacer hose is subjected to its maximum expected tension.

8. The system of claim 1 wherein the fittings are separated by about six to about eighteen feet.

9. The system of claim 1 wherein the tension element is located inside the delivery hose.

10. The system of claim 1 wherein the hose comprises inner and outer hose parts, the tension element extending through the inner hose part.

11. The system of claim 1 wherein the hose comprises inner and outer hose parts, the tension element extending the between the hose parts.

12. The system of claim 1 wherein the flexible tension element stretches less than ten percent as much as the hose under expected maximum load conditions.

13. The system of claim 1 wherein the flexible tension element is a mechanical cable assembly comprising a cable and fittings at each end of the cable.

14. The system of claim 13 wherein the cable is made of stainless steel having a diameter of about 1/16" to about 1/4".

15. The system of claim 1 wherein the tension element weighs less than four ounces per ten foot length.

16. The system of claim 1 wherein at least one of the hose fittings has an unobstructed substantially cylindrical interior wall at its free end, the system further comprising an adapter mounted in the cylindrical wall, the tension element being mounted to the adapter.

17. The system of claim 16 wherein the adapter comprises a collar and a generally diametrically extending pin mounted in the collar, the tension element comprising an eye through which the pin extends.

18. The system of claim 17 wherein the tension element comprises a threaded stud mounted to its end, the eye being threaded to the stud, the threaded stud permitting adjustment of the cable length to correspond to the extended, unstressed, length of the hose between the first and second fittings.

19. The system of claim 18 wherein the tension element is a mechanical cable, the threaded stud including a threaded section and a tubular section into which the cable extends.

20. The system of claim 1 wherein the hose comprises generally coaxial hose parts, wherein at least one of the hose fittings includes a spider for supporting an inner hose part, and wherein the tension element is at least partially mounted to the spider.

21. The system of claim 20 wherein the tension element is a cable assembly including a cable and a fitting at each end of the cable, the fitting having an outwardly extending lip.

22. The system of claim 21 wherein the spider is a bent metal clip, the fitting being trapped in a bend of the clip, the lip of the fitting engaging the clip.

23. The system of claim 21 wherein the spider is cast, the fitting being trapped between the inner hose part and the outer hose part.

24. A method for preventing damage to and by a flexible, stretchable, resilient liquid delivery hose used for dispensing fuel from a fuel dispenser structure through a manually operated nozzle to a vehicle fuel tank, the hose comprising a breakaway coupling having a nominal separation force of from one hundred to four hundred pounds, a section of the hose between the breakaway coupling and either the dispenser structure or the nozzle having a length of at least six feet, the method comprising attaching a flexible tension element between fittings at the ends of the section of the hose, the tension element reducing stretching of the delivery hose between the fittings at any tension less than the nominal separation force of the breakaway coupling to less than ten percent of the stretching of the delivery hose without the tension element.

25. The method of claim 24 wherein the tension element extends inside the section of the hose.

26. The method of claim 25 wherein the fuel dispenser includes a vapor recovery system, the hose comprising inner and outer hose parts, the tension element extending inside at least the outer hose part.

27. An improved hose adapted for use in a fuel delivery system, the hose comprising an elastomeric body, the hose having a length of at least six feet, the elastomeric body stretching to more than one hundred ten percent of its length when subjected to a two-hundred-fifty pound pull, the hose having fittings at its ends, the hose further including a linear tension element, the tension element extending the length of the hose, the tension element substantially preventing stretching of the hose when subjected to a two-hundred-fifty pound pull.

28. The hose of claim 27 wherein the linear tension element and the hose fittings are made of metal, the ends of the linear tension element being attached to the metal fittings.

29. The hose of claim 27 wherein the tension element has a cross-sectional area no greater than about 0.1 square inch, the tension element stretching less than ten percent as much as the elastomeric hose body when subjected to a two-hundred-fifty pound pull.

30. The hose of claim 29 wherein the tension element is a cable, the cable having a tensile breaking strength in excess of four hundred pounds and having an elongation of less than one percent when subjected to a two-hundred-fifty pound pull.

31. The hose of claim 27 wherein the tension element is a cable running inside the elastomeric hose, the cable being unattached to the elastomeric hose body.

* * * * *